United States Patent [19]
Braun et al.
[11] 3,893,180
[45] July 1, 1975

[54] TRANSDUCER POSITIONING SYSTEM

[75] Inventors: William A. Braun, Acton, Mass.; David S. Dunn, Windham, N.H.

[73] Assignee: Honeywell Information Systems Inc., Waltham, Mass.

[22] Filed: Jan. 2, 1974

[21] Appl. No.: 430,343

[52] U.S. Cl. .......... 360/77; 360/51
[51] Int. Cl. .. G11b 5/58; G11b 17/00; G11b 21/10
[58] Field of Search .......... 360/77, 78, 51, 75, 98, 360/105, 106

[56] References Cited

UNITED STATES PATENTS

| | | | |
|---|---|---|---|
| 3,156,906 | 11/1964 | Cummins | 360/78 |
| 3,479,664 | 11/1969 | Stuart-Williams | 360/77 |
| 3,534,344 | 10/1970 | Santana | 360/77 |
| 3,593,333 | 7/1971 | Oswald | 340/174.1 |
| 3,691,543 | 9/1972 | Mueller | 360/77 |
| 3,818,502 | 6/1974 | Chien et al. | 360/77 |
| 3,821,804 | 6/1974 | Stevenson | 360/78 |

*Primary Examiner*—Raymond F. Cardillo, Jr.
*Attorney, Agent, or Firm*—William F. White; Ronald T. Reiling

[57] ABSTRACT

A transducer positioning system is disclosed wherein a transducer is positioned over a magnetic disc by sensing previously recorded information. The information consists of separately identifiable magnetic recordings occurring on adjacent tracks of a disc surface. The information is sensed by a servo transducer which produces a servo signal containing responses to each identifiable magnetic recording. A transducer position is defined when the signal strength of each of the responses is exactly equal.

The signal strengths of each response are evaluated by a novel detection system which first identifies the responses within the servo signal. The peak amplitudes of the responses are thereafter separately measured and separate signals are produced indicative of the measured peak amplitudes. These separate signals are thereafter combined so as to indicate whether the signal strength of either response dominates over the other.

14 Claims, 10 Drawing Figures

TRANSDUCER POSITIONING SYSTEM

BACKGROUND OF THE INVENTION

This invention relates to the positioning of a transducer over a magnetic media. In particular, this invention relates to the fine positioning of a transducer over a data track on a magnetic disc through the detection of previously recorded position information.

Several systems have been developed which position a transducer over a data track on a magnetic disc in response to the detection of position information previously recorded on either the same magnetic disc or on a separately dedicated magnetic disc. One such system is disclosed in U.S. Pat. No. 3,534,344, entitled, "Method and Apparatus for Recording and Detecting Information", issued on Oct. 13, 1970, to G. R. Santana. The position information in Santana is recorded in successive tracks on a separately dedicated disc. Each track contains spaced sets of paired flux reversals. The sets of flux reversals in any given track are separately identifiable from the sets of flux reversals in the immediately adjacent tracks. Furthermore, the sets of flux reversals repeat every other track so that one separately identifiable set of flux reversals occurs in the odd tracks and another separately identifiable set of flux reversals occurs in the even tracks. The separately identifiable sets of flux reversals are sensed by a servo transducer which in turn produces a servo signal. When the servo transducer is exactly centered over adjacent odd and even servo tracks, the signal strength from the two adjacent tracks are equal. This servo signal condition is used to define a data track on an adjoining disc surface. When the servo transducer is not exactly centered over both an odd and an even servo track, then the signal strength of the nearest track will dominate within the servo signal. This signal strength is evaluated to ascertain whether it is attributable to an odd or an even servo track. The servo transducer is thereafter moved away from the track which has produced the stronger signal.

OBJECTS OF THE INVENTION

It is therefore an object of this invention to provide a position detection system which accurately measures positional error based upon the accurate detection of previously recorded track position information.

It is another object of this invention to provide a position detection system which incorporates a high speed peak measuring circuit for measuring the peak amplitudes of a high frequency servo-signal.

It is still further object of this invention to provide a high speed peak amplitude measuring circuit for use in detecting peak amplitudes occurring in high frequency signals.

SUMMARY OF THE INVENTION

The above objects are achieved according to the present invention by providing a position detection system which accurately detects the relative position of a servo transducer with respect to a set of adjacent tracks containing position information. The position information consists of either of two identifiable sets of paired flux reversals.

Each identifiable set of flux reversals produces a distinct waveshape which is first identified. The peak amplitude of each waveshape is thereafter measured. The difference between peak amplitudes in each distinct waveshape is generated so as to render an accurate indication of positional error.

BRIEF DESCRIPTION OF THE DRAWINGS

For a better understanding of the present invention, reference should be made to the accompanying drawings wherein.

DETAILED DESCRIPTION OF THE PREFERRED EMBODIMENT

Figure 1:
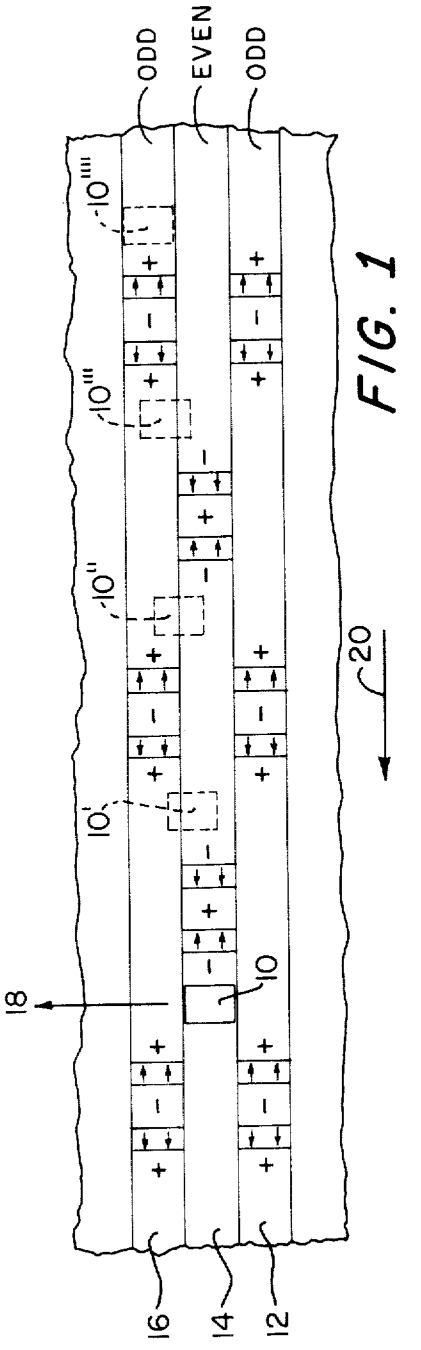
FIG. 1 schematically depicts the path of a servo transducer moving transversely with respect to adjacent tracks containing position information.

Referring to FIG. 1, a servo transducer 10 is shown in transducing relationship with a magnetic media 11 which contains three previously recorded servo tracks 12, 14 and 16. The recordings in the servo tracks 12, 14 and 16 comprise areas of magnetization which are either polarized in a first direction as indicated by a positive sign or polarized in a second direction as indicated by a negative sign. The double dividing lines between these oppositely signed areas represent where changes in magnetic polarization occur. Changes in magnetic polarization are commonly referred to as magnetic flux reversals and are indicated by the arrows within the double dividing lines. Tracks 12 and 16 are seen to normally be in a positive magnetic state with sets of flux reversals to and from a negative magnetic state. On the other hand, the recording in track 14 is normally in a negative magnetic state with sets of flux reversals to and from a positive magnetic state. It is to be noted that the sequential changes in magnetic state in the track 14 are positioned between the sequential changes in magnetic state in the tracks 12 and 16. Tracks 12 and 16 will be hereinafter referred to as "odd" servo tracks whereas track 14 will be referred to as an even servo track. It is to be understood that the servo tracks 12, 14 and 16 represent only three from among a plurality of alternating odd and even servo tracks appearing on the magnetic media 11.

The servo transducer 10 is shown in a first position over the even servo track 14. For purposes of illustration, it is to be understood that the servo transducer 10 moves transverse to the servo tracks 12 – 16 in the direction indicated by the arrow 18. It is to be furthermore understood that the servo tracks 12 – 16 move in a direction indicated by the arrow 20. The resulting path which is traced by the servo transducer 10 is indicated by the successive phantom servo transducers 10', 10'', 10''', and 10''''.

The servo transducer 10 is ideally positioned when it is centered midway between an odd and an even track as is indicated by the phantom transducer 10''. When so positioned, the peak amplitudes resulting from sensing the periodically occurring sets of paired flux reversals in the odd and even tracks should be equal. This condition defines a data track on another disc surface which is dedicated to data. If the servo transducer 10 moves off center, the detected peak amplitudes resulting from the periodically occurring sets of flux reversals of one servo track will increase and those of the other servo track will decrease.

Figure 2:
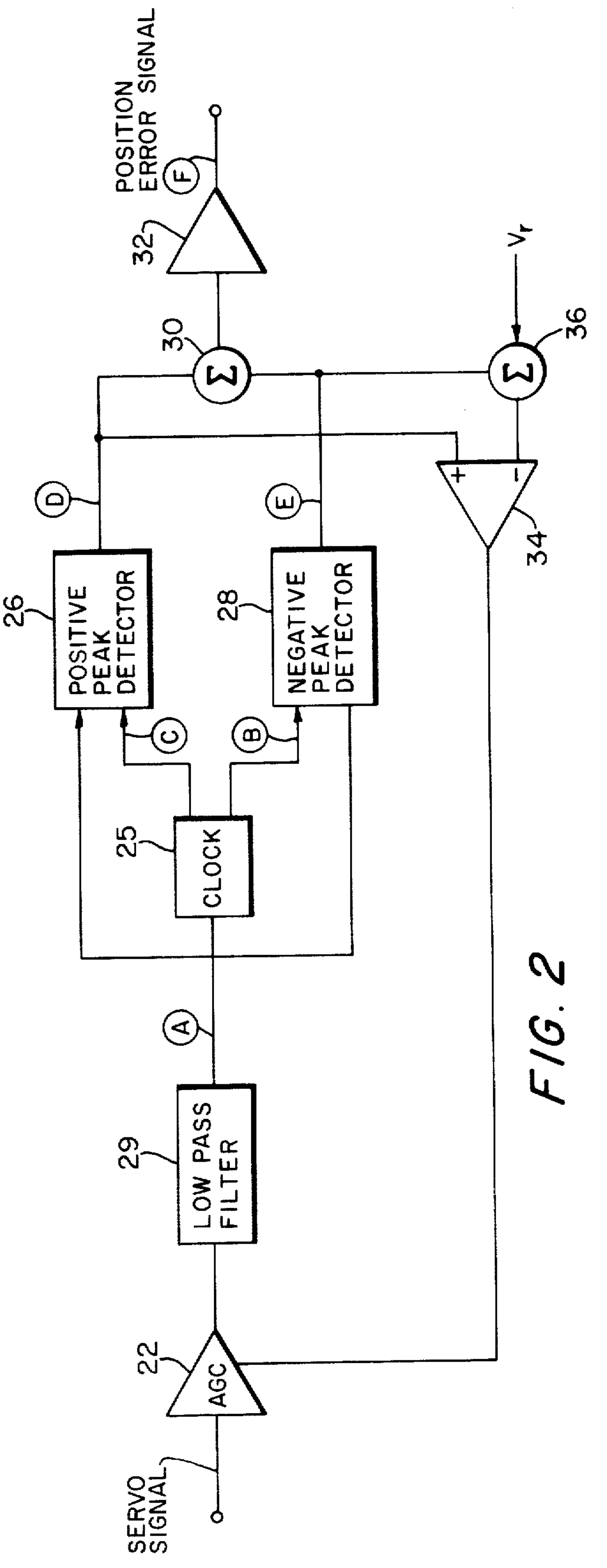
FIG. 2 illustrates the position detection system which detects and identifies the peak amplitudes of the waveshapes generated by the servo transducer of FIG. 1.

FIG. 2 illustrates the position detection system which detects the peak amplitudes present in the servo signal. The servo signal which is generated by the servo transducer 10 of FIG. 1 is applied to an automatic gain control amplifier 22. The output of the automatic gain control amplifier 22 is filtered through a low pass filter 24 and thereafter applied to a phase locked clock 25, a positive peak detector 26 and a negative peak detector 28. The phase locked clock 25 generates a clocking signal which activates either the positive peak detector 26 or the negative peak detector 28. Each peak detector, when activated, measures the peak amplitude of the filtered servo signal and provides an output signal level indicative of the last occurring peak amplitude. The output signals from the peak detectors 26 and 28 are summed by a summing circuit 30 and the resulting sum is thereafter amplified by an amplifier 32. The resulting position error is applied to a servo system (not shown) which moves the servo transducer 10 in response to the position error indicated at the output of the amplifier 32. The output signals from the positive and negative peak detectors 26 and 28 are also applied to a differential amplifier 34 which, in turn, is connected to the automatic gain control amplifier 22. In connection therewith, it is noted that the output of the negative peak detector 28 is first summed with a reference potential at a summing circuit 36 and the results are applied to the inverting input of the differential amplifier 34.

Figure 3:
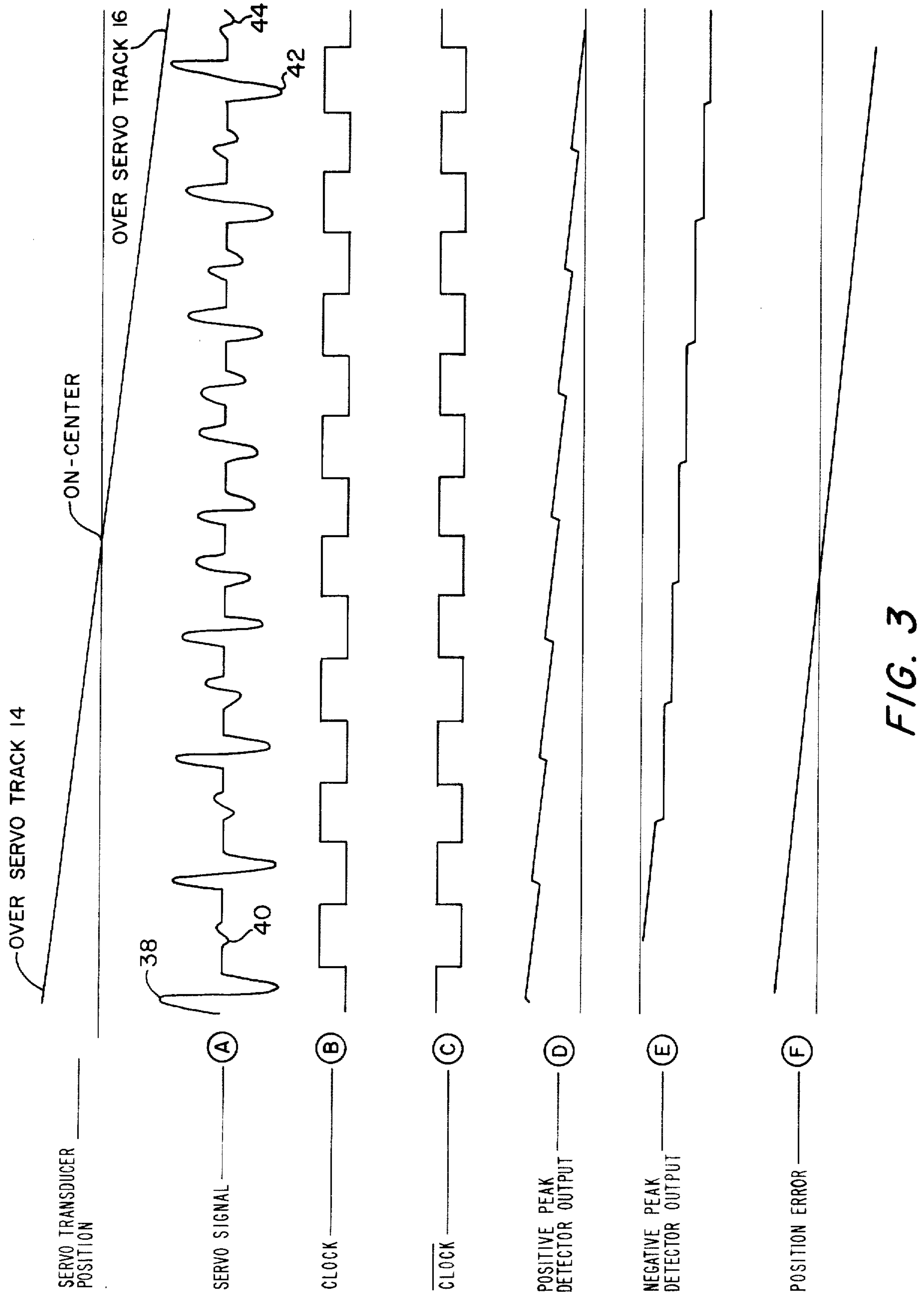
FIG. 3 illustrates the signal waveforms present at the designated points within the position detection system of FIG. 2 when the servo transducer of FIG. 1 travels the path outlined in FIG. 1.

The operation of the position detection system of FIG. 2 for the path traced by the servo transducer 10 of FIG. 1 is illustrated by the waveforms of FIG. 3. The position of the servo-transducer 10, relative to being "on-center" is first illustrated in FIG. 3. It will be remembered that the servo-transducer 10 is "on-center" when it is centered between two adjacent servo tracks. This is exemplified in FIG. 1 by the phantomed servo transducer 10'' and is furthermore indicated in FIG. 3 by the "on-center" point. The "on-center" point of FIG. 3 is to be contrasted with the extreme "off-center" points which occur when the servo transducer 10 is entirely over one or the other servo tracks as is evidenced in FIG. 1 by the initial position of the servo transducer 10 over the servo track 14 and the final position of the phantom servo transducer 10'''' over the servo track 16. While the final position of the servo transducer 10 is "off-center" in FIGS. 1 and 3, it should nonetheless be understood that in practice the servo transducer 10 will be eventually moved to an "on-center" position.

Waveform A in FIG. 3 represents the filtered servo signal present at location A in the position detection system of FIG. 2 when the servo transducer 10 follows the path of FIG. 1. The waveform A contains a series of reoccurring waveshapes, each of which consists of two pulses, one being positive, and the other being negative. These waveshapes will hereinafter be referred to as dipulses. Waveform A begins with an initially positive going dipulse 38 (hereinafter referred to as a positive dipulse) followed by a relatively small and insignificant negative going dipulse 40 (hereinafter referred to as a negative dipulse). The positive dipulse 38 represents a sensed set of flux reversals occurring on the even servo track 14 when the servo transducer 10 is in its original initial position in FIG. 1. The negative dipulse 40 indicates the relative signal strength of an opposite set of flux reversals present on the odd servo track 16. As the servo transducer 10 approaches the "on-center" position, the positive dipulses become smaller, and the negative dipulses become larger. At the "on-center" position, the positive and negative dipulses are equal. This is followed by a diminishing amplitude of the positive dipulses and an increasing amplitude of the negative dipulses until the negative dipulse 42 is relatively large in comparison to the positive dipulse 44. This latter condition is seen to occur when the servo-transducer 10 has traveled to the "off-center" location of being completely located over the odd servo track 16. It is therefore to be appreciated that depending on which servo track the servo transducer 10 is located over, either a strong positive or negative dipulse will be present in the filtered servo signal. In the event that the servo transducer 10 is "on-center" between any two servo tracks, the amplitudes of the respective dipulses will be equal.

The peak amplitudes of the positive and negative dipulses of waveform A are measured by the positive and negative peak detectors 26 and 28, respectively. The peak detectors are activated by a clock signal from the clock 25 which is represented by the waveform B in FIG. 3. The clock signal is high in the waveform B when a negative dipulse occurs in the waveform A and is low when a positive dipulse occurs. A waveform C representing the negation of the clock signal of waveform B is also generated by the clock 25. The clocking signals represented by the waveforms B and C activate the positive peak detector 26 during a positive dipulse and the negative peak detector during a negative dipulse. Each so activated peak detector performs its designated type of peak amplitude measurement and provides an output signal indicative of the most recently occurring peak amplitude measurement.

The output signals from the positive and negative peak detectors 26 and 28 appear in FIG. 3 as the waveforms D and E. The positive peak detector output waveform D begins with a high positive peak amplitude and steadily decreases to zero. The negative peak detector output waveform E begins at zero and thereafter decreases in a negative direction to a maximum negative amplitude. The decreasing signal levels in both peak detector output waveforms are replete with small discontinuities. These discontinuites are caused by an internal ramping function within each peak detector which dictates that the peak detector output decreases at a slightly greater rate than that of the successively detected peak amplitudes. Each discontinuity hence represents a correction in the peak detector output reflecting the measurement of the next successively occurring peak amplitude.

The peak detector output waveforms D and E are summed algebraically at the summing junction 36 and the results are amplified and filtered by the d.c. amplifier 32 so as to produce the position error signal of waveform F. The position error signal is applied to a servo system (not shown) which centers the servo transducer 10 between the two servo tracks 14 and 16. As has been previously explained, the waveforms of FIG. 3 do not indicate that such an "on-center" condition is eventually accomplished.

The negative peak detector output waveform E is first summed algebraically with a constant reference voltage $V_r$, at the summing junction 36 and the results are thereafter applied to the differential amplifier 34 which algebraically subtracts the results from the positive peak detector output waveform D. The resulting difference appearing at the output of the differential amplifier 34 is applied to the automatic gain control amplifier 22. This resulting difference should remain constant and any deviation in it represents an error in the magnetic readback at the servo transducer 10. This error will be compensated for by the automatic gain control amplifier 22 which will automatically adjust its gain in response to any such deviation.

Having now described the overall operation of the peak detection system of FIG. 2, the peak detectors 26 and 28 will now be discussed in detail. The positive peak detector 26 is shown in detail in FIG. 4 and begins with a comparator 50 connected to an AND gate 52. The AND gate 52 is connected to a current source 54 which is itself connected to a common terminal 56 of a capacitor 58. The second terminal of the capacitor 58 is grounded. A current sink 60 is also connected to the common terminal 56 of the capacitor 58. Current sources and current sinks are well known in the art and will not be discussed in detail. For the purpose of understanding the invention, the current source 54 can be considered to be a resistor connected to a large positive potential which when activated by the AND gate 52 causes current to flow from the large positive potential. The current sink 60 on the other hand can be a resistor connected across the capacitor. An output line 64 and a feedback line 66 are also connected to the common terminal 56. The feedback line 66 is connected to the inverting input of the comparator 50.

The operation of the positive peak detector 26 begins with the amplified and filtered servo signal from the low pass filter 24 occurring at location A being applied to the non-inverting input of the comparator 50. When the amplitude of this servo signal exceeds the feedback signal amplitude appearing on the feedback line 66, the comparator 50 produces an output signal which is applied to the AND gate 52. The AND gate 52 goes high in response to the simultaneous occurrence of an output signal from the comparator 50 and a clock pulse from the clock negation signal occurring at location C. It will be remembered that the clock negation signal waveform C of FIG. 3 is logically high when a positive dipulse occurs in the servo signal waveform A. Hence, the positive peak detector will only respond to the positive peak amplitudes of the positive dipulses. The output of the AND gate 52 activates the current source 54 which charges the capacitor 58. The voltage level of the charged capacitor 56 is feedback to the inverting side of the comparator 50 via the feedback line 66 and is compared with the amplitude of the servo signal. When the feedback charge voltage exceeds the amplitude of the servo signal, the output signal from the comparator 50 returns to zero and the AND gate 52 goes low thereby turning off the current source 54. The current sink 60 then discharges the capacitor 58 at a controlled rate.

To summarize the operation of the positive peak detector 26, the capacitor 58 is automatically charged by the current source 54 when the servo signal at any given time exceeds the fedback voltage level from the common terminal 56. When the amplitude of the servo signal no longer exceeds the fedback voltage level, the current source is automatically turned off and the capacitor 58 thereafter discharges at a controlled rate through the current sink 60. The charging and discharging of the capacitor 58 thus depends on the following key parameters: the charge current from the charging source 54, $I_c$, the discharge current to the discharge sink 60, $I_d$ and the capacitance, C of the capacitor 58. The values which these parameters will assume depends on the particular characteristics of the servo signal as will now be discussed.

Figure 5:
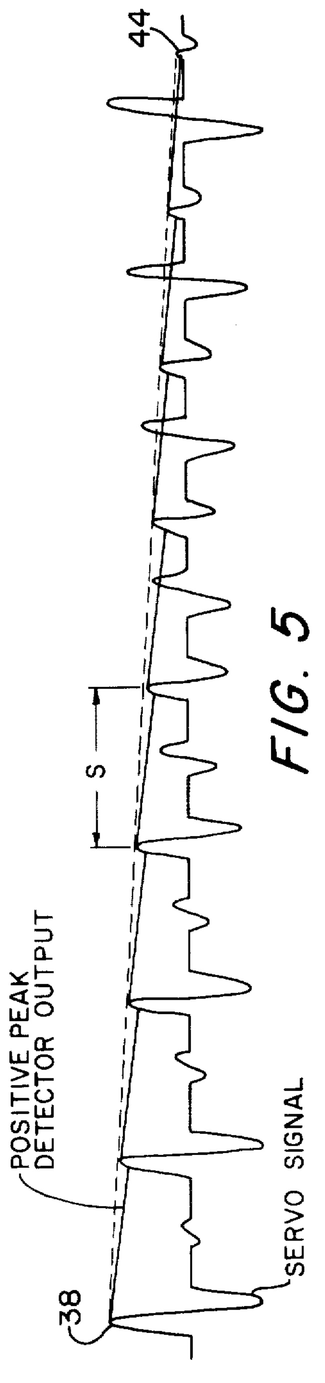
FIG. 5 illustrates the relationship between the output and input signals of the positive peak detector of FIG. 4.

Referring to FIG. 5, the servo signal waveform A of FIG. 3 is reproduced with the positive peak detector output waveform D being superimposed thereover. It is seen that the positive peak detector output contains a series of downward sloping ramps which intersect the positive dipulses at slightly less than the maximum positive peak amplitudes. The slope of each of these ramps is slightly steeper than the actual dotted line slope of the decreasing positive peak amplitudes. The dotted line slope can be computed by first of all remembering that the positive dipulses decrease in amplitude from a maximum amplitude evidenced by the positive dipulse 38 to a minimum amplitude evidenced by the positive dipulse 44. A preferred servo signal voltage level for the maximum peak amplitude of the positive dipulse 38 is 2 volts and a preferred time duration for the positive dipulses to decrease from the maximum positive dipulse amplitude to the minimum positive dipulse amplitude is 50 microseconds. This preferred time duration represents the time for the servo-transducer 10 to travel from one servo track to an adjacent servo track. Hence, assuming that the minimum positive peak amplitude of the dipulse 44 is negligible, the slope of the positive peak amplitudes is 2 volts divided by 50 microseconds or 0.04 volts/microsecond. A preferred slope for the ramps of the positive peak detector output is set at the slightly higher slope of 0.06 volts/microsecond. Next, a preferred spacing, S, between positive dipulses peak amplitudes is 2.24 microseconds. This spacing is a function of the spacing of the sets of flux reversals on the magnetic media and the speed of the media.

Figure 6:
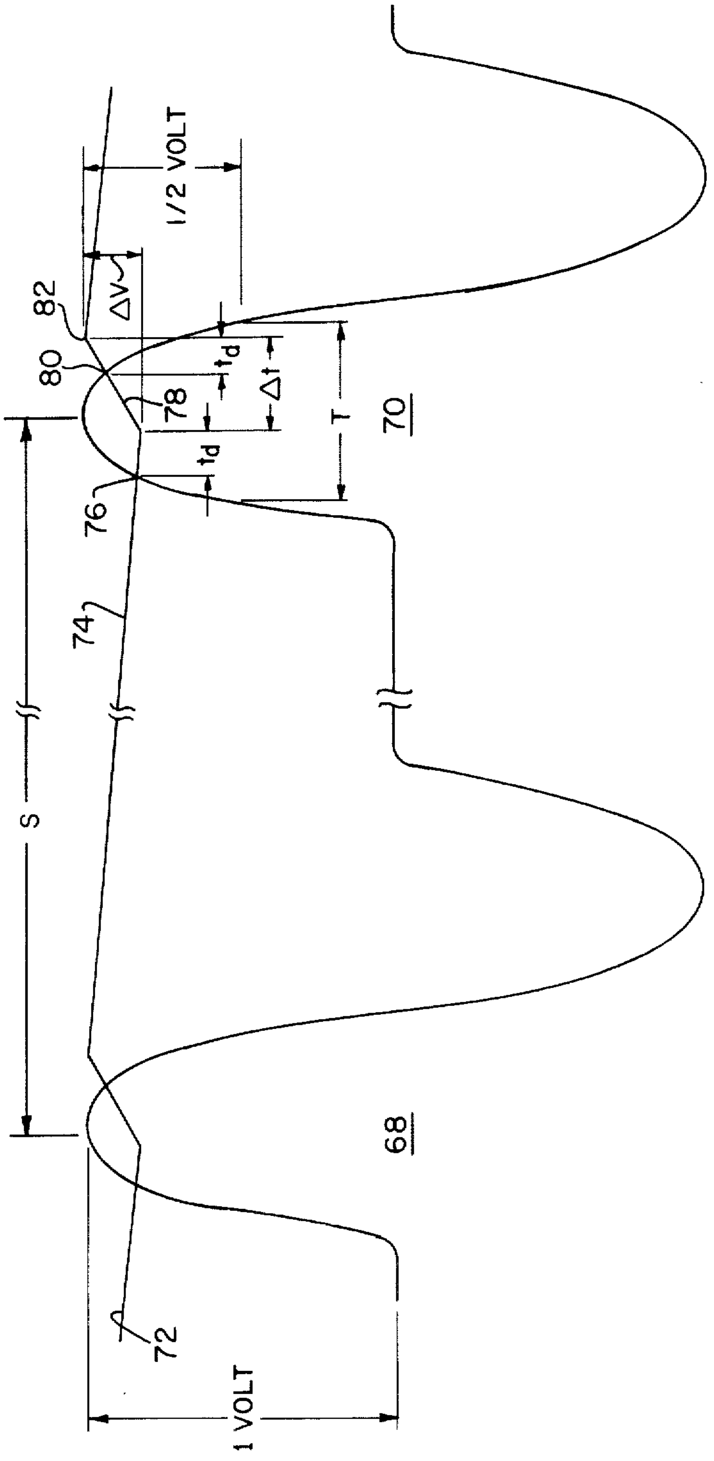
FIG. 6 illustrates a detailed relationship between the output of the positive peak detector of FIG. 4 for a particular dipulse waveshape occurring at its input.

Referring to FIG. 6, a set of two successively occurring positive dipulses 68 and 70 are illustrated with a positive peak detector output signal 72 imposed thereover. The spacing, S, between the positive dipulses is broken in order to illustrate that a negative dipulse occurs between these positive dipulses. The dipulses 68 and 70 are of the same amplitude and illustrate an "on-center" condition which imposes a more stringent requirement on the positive peak detector circuit 26 than that of FIG. 5. In other words, the positive peak detector output 72 has declined at a rate of 0.06 volts/microsecond between the positive dipulses in anticipation that the amplitude of the second dipulse 70 would be less. However, the amplitude of the second dipulse has not changed, thus necessitating that the output signal 72 of the positive peak detector quickly return to the first dipulse amplitude. Since the spacing, S, between successive-like pulses is 2.25 microseconds and since the positive peak detector output declines at a rate of 0.06 volts/microsecond, the voltage drop between successive positive peak amplitudes will be 0.06×2.25 or 0.135 volts. Referring to the dipulse 70, this voltage drop must subsequently be made up during the time in which the actual positive peaking occurs.

The positive peak of the dipulse 70 is intersected by a downward sloping ramp 74 of 0.06 volts/microsecond at a point 76. This downward sloping ramp is due to the discharge of the capacitor 58 through the current sink 60 as has been discussed previously. The downward sloping ramp 74 continues for a time $t_d$ after the intersection 76 due to a delayed reaction of the comparator 50 in the positive peak. After the downward sloping ramp 74 terminates, the output of the positive peak detector rises as is evidenced by the upward ramp 78. The slope of the upward ramp 78 depends on the rate at which the current source 54 charges the capacitor 58. The upward ramp 78 intersects the dipulse 70 at an intersection point 80 and continues for a time $t_d$ before it terminates at a point 82. This delay is again attributable to the delayed reaction of comparator 50 in the positive peak detector 26. Knowing the delay $t_d$ for a particular positive peak detector circuit, and knowing the shape of the peak of a positive dipulse, the rate at which the capacitor 58 must be charged in order to achieve the peak amplitude of the positive dipulse at the point 82 can be graphically determined. This charge rate is the slope of the upward ramp 78 indicated as $\Delta V/\Delta t$ in FIG. 6.

For a time delay $t_d$ of 30 nanoseconds, a pulse amplitude of one volt, and a half amplitude pulse width T of 70 nanoseconds, the graphically determined charge rate is 3 volts/microsecond. It is to be noted that FIG. 6 has not been drawn to scale for the purpose of making such a graphical determination. Once knowing the charge rate and the discharge rate, the parameters $I_d$, $I_c$ and C can be ascertained according to the following relationships:

| | |
|---|---|
| $I_d/C$ = discharge rate of capacitor 58 to current sink 60 | = .06 volts/microsecond |
| $I_c/C$ = charge rate of capacitor 58 by current source 54 | = 3 volts/microsecond |

For a capacitance of 750 picofarads, the discharge current $I_d$ is 0.05 milliamps and the charge current, $I_c$, is 2.5 milliamps.

Figure 4:
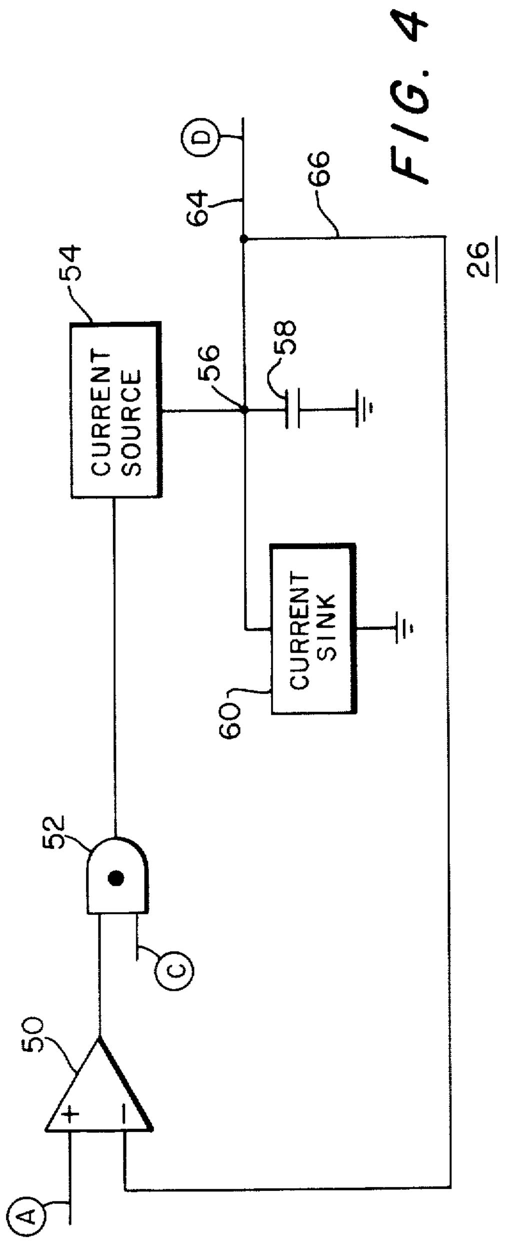
FIG. 4 illustrates in detail the positive peak detector of the position detection system of FIG. 2.
Figure 7:
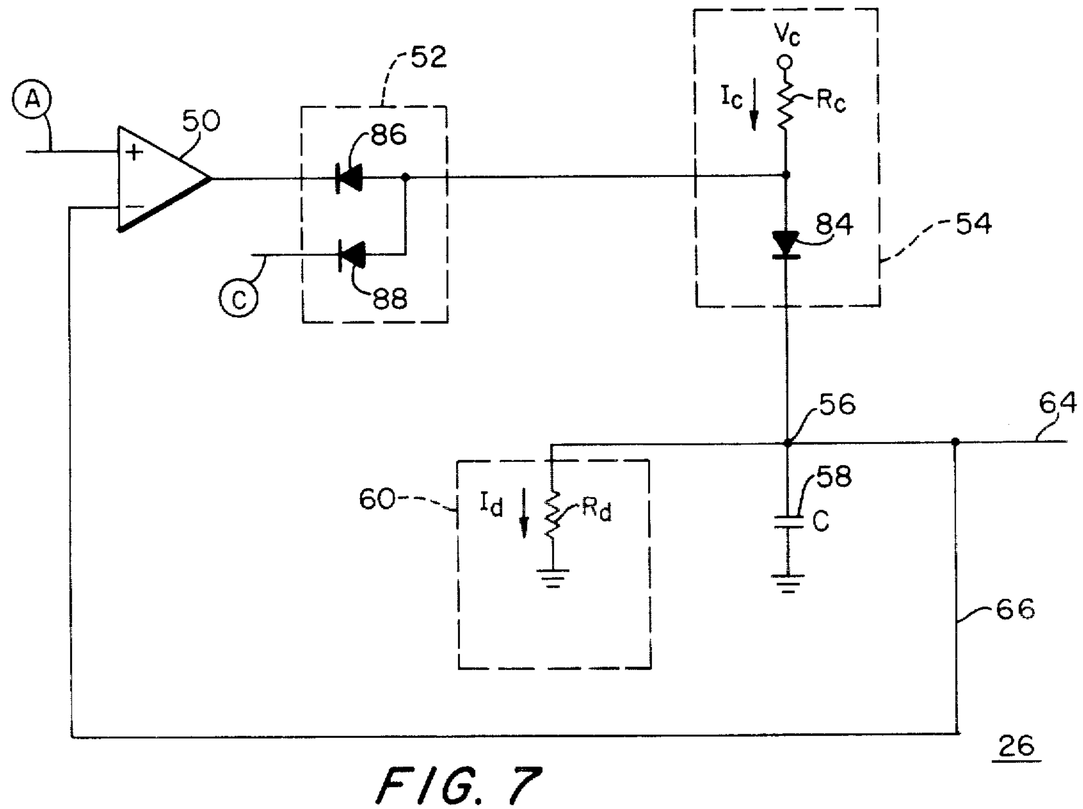
FIG. 7 illustrates in further detail the positive peak detector of FIG. 4.

Referring now to FIG. 7, wherein several of the elements of the peak detector circuit of FIG. 4 are illustrated in further detail, the resistance values for these elements can now be ascertained for the circuit parameters $I_d$, $I_c$ and C. The operating norm voltage, $V_n$ at the point 56 is 1 volt for the on-center condition of FIG. 6. Hence, the resistance $R_d$ of the current sink 60 is $1/I_d$ or 20 kilo ohms. The resistance $R_c$ of the current source 54 is calculated for a charge source voltage, $V_c$ of 15 volts. Knowing the charge source voltage, and ignoring the minor voltage drop across the diode 84, the resistance, $R_c$ is equal to the voltage drop of 14 volts across $R_c$ divided by the charge current, $I_c$ of 2.5 milliamps which turns out to be 5.6 kilo ohms.

Having now assigned voltages and circuit component values to the positive peak detector of FIG. 7, the function of the AND gate 72 can now be further described. The AND gate 72 is seen to comprise a pair of diodes 86 and 88 which define directional discharge paths for the current source 54. When either the output signal from the comparator 50 or the clock negation signal is low, a directional discharge path will be established for the current source 54. However, when both the output signal from the comparator 50 and the clock negation signal C are logically high, the diodes 84 and 86 will be back biased thus causing the current source 54 to charge the capacitor 58. Hence, the diodes 84 and 86 perform the AND gate function wherein both inputs must be logically high to turn on the current source 54 to thereby charge the capacitor 58. When the current source is not so activated, the diode 84 insures that the capacitor 58 does not discharge back, but through to the discharge path through the AND gate 52.

Figure 8:
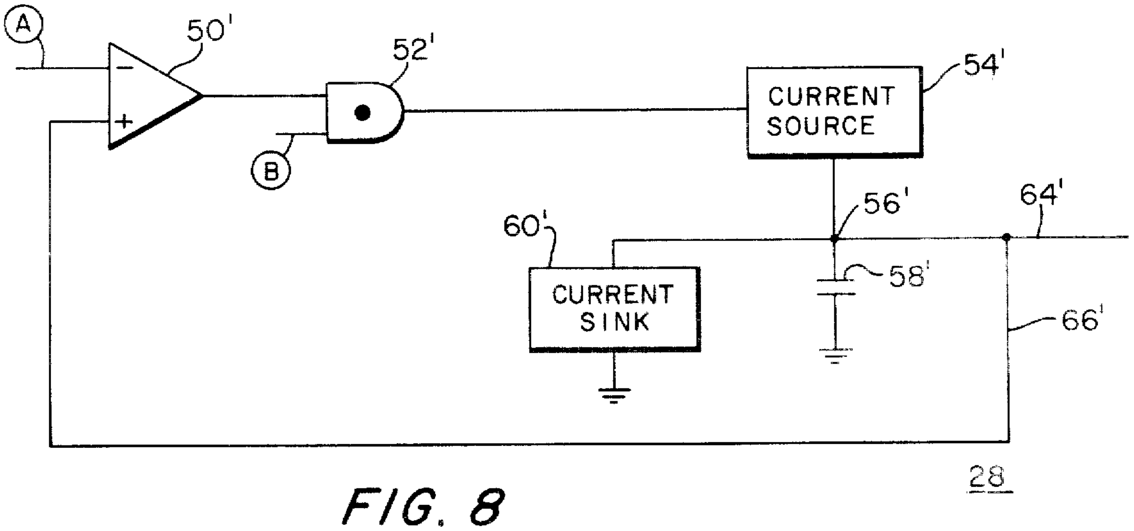
FIG. 8 illustrates in detail the negative peak detector of the position detection system of FIG. 2.

The negative peak detector 28 is shown in detail in FIG. 8. The various components of the negative peak detector have been similarly labeled with prime numbers to correspond to similar elements in the positive peak detector 26 of FIG. 4.

The operation of the negative peak detector 28 is similar to that of the positive peak detector 26 in that the capacitor 58' is charged or discharged depending on the output of the AND gate 52'. The output of the AND gate 52' is high during the simultaneous occurrence of a pulse from the clock signal appearing at location B and a positive signal from the comparator 50'. The high level output of the AND gate 52' activates the current charging source 54' which charges the capacitor 58' negatively. The voltage fall which thus occurs at the common terminal 56' produces a falling output signal on the output line 64'. This type of signal increase in the negative direction brings the output of the negative peak detector into agreement with the negative peak amplitude of the current negative dipulse. Once this occurs, the current source is turned off on the voltage at the common terminal 56' and decreases toward zero due to the current sink 60'.

In summary, the negative peak detector 28 operates in much the same manner as that of the positive peak detector 26 with the capacitor 58' being either charged or discharged depending on whether the current source 54' is activated. The parameterization of these elements of the negative peak detector 28 is also the same as that of the positive peak detector 26. This is readily understood since the peak sensing of both positive and negative peak detectors is the same with the exception of the clock signal conditioning for the separate types of dipulses, and the inverted polarity of the output signal.

Figure 9:
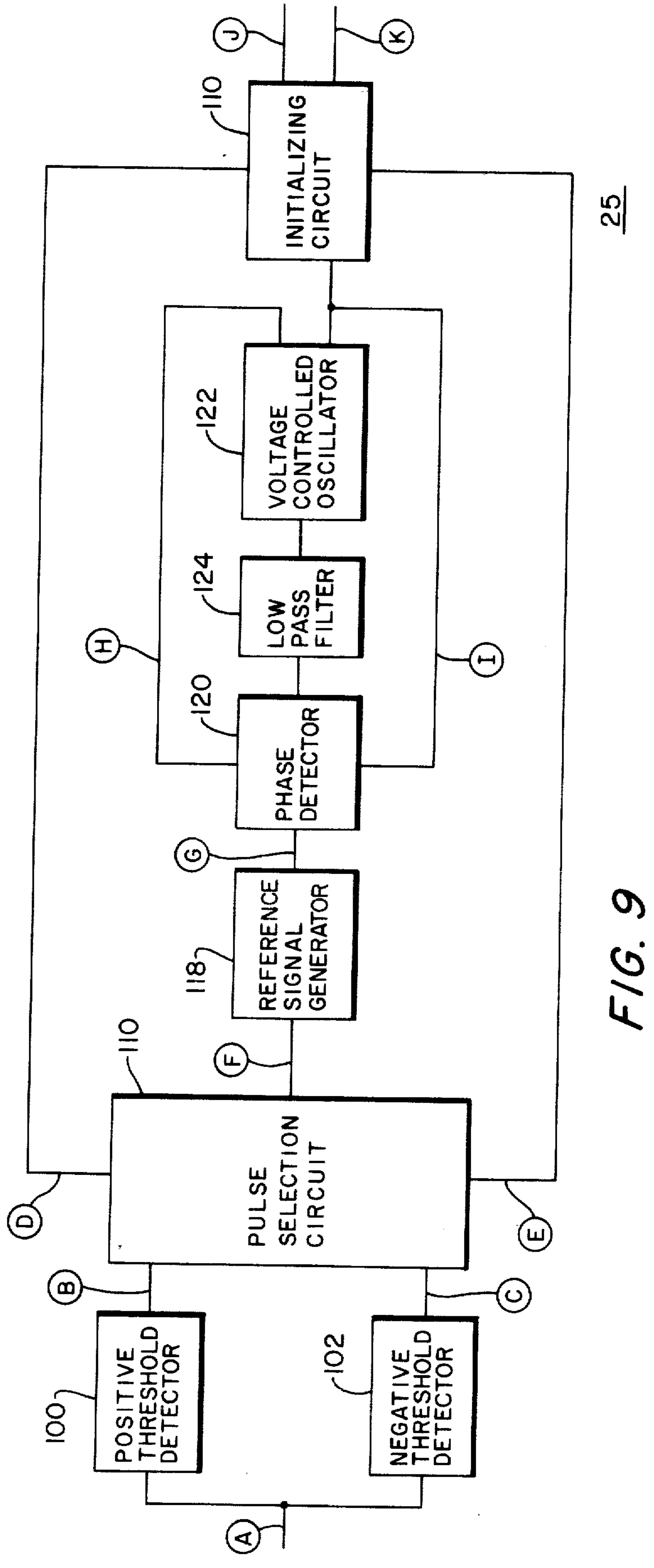
FIG. 9 illustrates the phase locked loop clock of the position detection system of FIG. 2.

It will be remembered that the peak detectors 26 and 28 are conditioned by a phase locked loop clcok 25. The phase locked loop 25 is illustrated in detail in FIG. 9. It is to be understood that this phase locked loop is the subject of a commonly assigned U.S. patent application Ser. No. 430,375 by David S. Dunn, filed Jan. 2, 1974 and entitled, "Phase Locked Loop Clocking System". It is to be noted at the outset that further details of the phase locked loop clock of FIG. 9 are set forth in the aforementioned U.S. patent application Ser. No. 430,375 by David S. Dunn.

Figure 10:
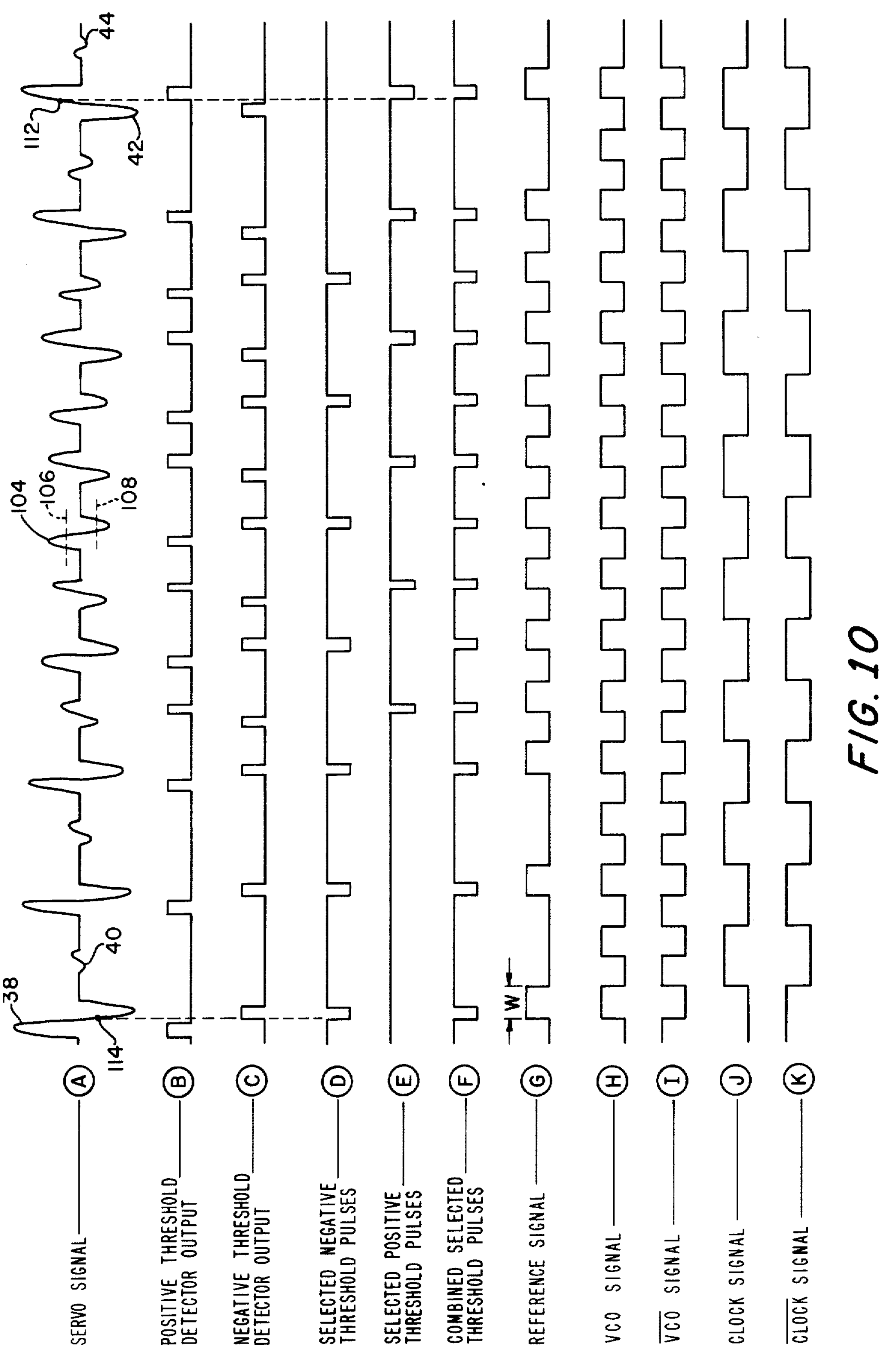
FIG. 10 illustrates the signal waveforms present at the designated points within the phase locked loop clock of FIG. 9.

Examples of wave forms appearing at the alphabetically labelled locations in the phase locked loop clock of FIG. 9 are illustrated in FIG. 10. Wave form A in FIG. 10 represents the amplified and filtered servo signal from the low pass filter 24 in FIG. 2. It is to be noted that the waveform A in FIG. 9 corresponds to the waveform A in FIG. 3 and retains the labelling of the latter as well as further labelling. Referring to FIG. 9, the amplified and filtered servo signal is applied to a positive threshold detector 100 and a negative threshold detector 102. The respective outputs of the positive and negative threshold detectors are illustrated in FIG. 10 as wave forms B and C. The positive threshold detector output wave form B is positive each time a dipulse in the servo signal wave form A exceeds the positive threshold setting of the positive threshold detector 100. The threshold setting of the positive threshold detector 100 is preferably set at 50 percent of the positive peak amplitude of a dipulse which would occur in response to the servo transducer 10 being "on-center" between two adjacent servo tracks. It will be remembered that the servo signal wave form A of FIG. 3 is "on-center" at approximately the middle of the wave form A. This corresponds to the dipulse 104 in the wave form A of FIG. 10. Accordingly, 50 percent of the positive amplitude of the dipulse 104 is the preferred threshold setting for the positive threshold detector 100. This is indicated by the dotted line 106 intersecting the positive pulse of the dipulse 104 at 50 percent of the peak amplitude of the positive pulse. In a similar manner, the threshold setting for the negative threshold detector 102 is set at 50 percent of the negative peak amplitude of the dipulse 104 as is indicated by the dotted line 108. The negative threshold detector output wave form C is logically high each time the dipulses in the wave form A exceed the threshold setting of the negative threshold detector. It is to be understood that the threshold settings of the positive and negative peak detectors 100 and 102 can be varied within the scope of the invention.

Referring to the wave forms A, B and C, it is seen that the threshold detector output wave forms remain low during the dipulses 40 and 44. This is due to the fact that the amplitudes of both dipulses never exceeds the threshold settings of the positive and negative threshold detectors. The absence of any output signal from the threshold detectors effectively results in a dipulse drop-out for the phase locked loop clock. It will be shown hereinafter that the phase locked loop clock is operative to maintain a phase locked condition during such a drop-out.

Returning now to FIG. 9, the output signals from the positive and negative threshold detectors 100 and 102 are applied to a pulse selection circuit 110. The pulse selection circuit 110 selects certain threshold pulses from the positive and negative threshold detectors 100 and 102 and generates three separate trains of selected threshold pulses at its three outputs identified as locations, D, E, and F in FIG. 9. The pulse selection circiut 110 selects the threshold pulse output from only one of the two threshold detectors during the occurrence of any one dipulse.

Referring to FIG. 10, the pulse selection circuit 110 is operative to select the threshold pulse output from the positive threshold detector 100 of wave form B when a negative dipulse such as 42 occurs in the wave form A. This is reflected by the train of selected positive threshold pulses appearing as wave form E in FIG. 10. Similarly, the threshold pulse output from the negative threshold detector 102 is always selected by the pulse selection circuit 110 when a positive dipules such as 38 occurs in the wave form A. This is demonstrated by the train of selected negative threshold pulses of wave form D. It is to be noted that the selected threshold pulses occurring in the wave forms D and E represent the threshold detection of the second pulse to occur in each of the dipulses of wave form A. In addition to the individual trains of selected threshold pulses of wave forms D and E, the pulse selection circuit 110 also generates a combined train of selected threshold pulses indicated by the wave form F.

It is to be appreciated that the leading edge of a selected threshold pulse in any of the wave forms D, E or F defines a particularly reliable data point on the corresponding dipulse wave shape in the wave form A. Specifically, the leading edge of each selected threshold pulse defines a point on the second pulse of each dipulse wherein the amplitude first exceeds the threshold setting. In the case of the negative dipulse 42, this is a point 112, and in the case of the positive dipulse 38, this is a point 114. It is to be noted that these points lie on the steep slope occurring during the transition from the peaking of the first pulse to the peaking of the second pulse in each dipulse wave shape. This steep slope minimizes the uncertainty of when these particular points occur.

Returning to FIG. 9, the outputs D and E from the pulse selection circuit 110 are applied to an initializing circuit 116. The initializing circuit assigns either a logically high or a logically low level to the clock signal outputs of the phase locked loop clocking system 25. The initializing circuit assures that the clock signal J is logically high for a negative dipulse and logically low for a positive dipulse. The wave forms J and K of FIG. 10 correspond to wave forms B and C in FIG. 3.

The combined train of selected pulses occurring at the output H of the pulse selection circuit 110 is applied to a reference signal generator 118. The reference signal generator 118 generates the reference signal wave form G in FIG. 10 (and the negation thereof which is not shown) in response to the combined selected threshold pulses of the wave form F. The reference signal wave form G comprises a series of pulses, each having a pulse width W. The pulse width W is particularly chosen to be one-half of the normal spacing between similar points on the alternating dipulses of the wave form A. The reference signal (and the negation thereof) is applied to a phase detector 120 which detects any phase difference between the reference signal and the VCO signal which is fedback from a voltage controlled oscillator 122. Any detected phase difference is applied to a low pass filter 124 which retains an indication of the detected phase difference and applies the same to the voltage controlled oscillator 122. The voltage controlled socillator 122 will either speed up, slow down, or maintain a constant frequency depending on the indicated phase difference from the low pass filter 124.

Referring to FIG. 10 and specifically to the reference signal wave form G, it is to be noted that several pulse drop outs occur in this signal. These pulse drop-outs can often be traced back to the threshold detectors which do not respond to low amplitude dipulses such as 40 and 44. However, a dipulse drop-out might also occur due to a complete signal drop-out. Whenever a pulse drop-out does occur in the reference signal, the phase detector 120 will not attempt to generate a phase difference between the missing pulse and a corresponding pulse in the VCO signal. The particular logic necessary to implement such a phase detector 120 is disclosed in U.S. patent application Ser. No. 430,375, entitled, "Phase Locked Loop Clocking System", filed on Jan. 2, 1974 to David S. Dunn.

Returning to FIG. 9, the output of the voltage controlled oscillator is applied to the initializing circuit 116. The initializing circiut halves the frequency of the voltage controlled oscillator and initially assigns a signal level to the resulting output signal which also constitutes the output clock signals of the pulse locked loop clock system. The initializing circuit assigns a logically high level to the system output if the dipulse then occuring in the servo signal is a negative dipulse. Similarly, a logically low level is assigned to the system output signal if a positive dipulse is then occurring in the servo signal. The clock signal outputs are labelled J and K in FIG. 9 and produce the clock signal wave forms J and K in FIG. 10. These clock signal outputs and wave forms correspond with the B and C clock outputs of FIG. 2 and the clock signal wave forms B and C of FIG. 3. As has been previously explained, the clock signal output signals B and C are applied to the negative and positive peak detectors 26 and 28 so as to activate either one or the other depending on the particular dipulse then occurring in the servo signal.

The preferred embodiment of the position detection system in FIG. 2 has been limited to particularly disclosed logic elements. It should nonetheless be understood that it is within the scope of the invention to cover structural equivalents of the disclosed logic elements. For instance, an alternative clocking system to that of FIGS. 9 and 10 that provides a synchronous clock having the appropriate signal polarity could be utilized within the position detection system of FIG. 2.

What is claimed is:

1. In a magnetic storage device wherein a transducer is positioned over a magnetic media by sensing position information, the sensed position information consisting of a train of pulses having two basic pulse configurations the first pulse configuration consisting of a first pulse of a first polarity followed by a second pulse of a second polarity and the second pulse configuration consisting of a first pulse of the second polarity followed by a second pulse of the first polarity, a system for detecting certain peak amplitudes within the train of pulses comprising:

means for detecting the positive peak amplitude of a pulse having a positive signal polarity in each first pulse configuration, said positive peak amplitude detection means generating a signal indicative of the positive peak amplitude detection;

means for detecting the negative peak amplitude of a pulse having a negative signal polarity in each second pulse configuration, said negative peak amplitude detection means generating a signal indicative of the negative peak amplitude detection;

means for generating a clock signal having a first signal level when the first pulse configuration occurs in the train of pulses and having a second signal level when the second pulse configuration occurs in the train of pulses;

wherein said positive peak amplitude detection means comprises means, responsive to said clocking means, for initiating the detection of a pulse having a positive signal polarity in each first pulse configuration; and said negative peak amplitude detection means comprises means, responsive to said clocking means, for initiating the detection of a pulse having a negative signal polarity in each second pulse configuration, wherein each of said peak amplitude detection means comprises:

a capacitive storage means, means, responsive to said initiating means, for charging said capacitive storage means, means for discharging said capacitive storage means at a defined rate, said discharging means being operative to decrease the stored signal level of said capacitive storage means when said capacitive storage means is not being charged by said charging means, means for feeding back the signal level of said capacitive storage means, and means for comparing the signal level of the incoming train of pulses with the feedback signal, said comparing means being operative to provide a signal to said initiating means when the signal level of the incoming train of pulses exceeds the feedback signal; and means for summing the signals indicative of the positive peak amplitude detection and the negative peak amplitude detection, said summing means producing a signal indicative of the relative signal strengths of the detected peak amplitudes in each basic pulse configuration.

2. The system of claim 1 wherein each of said means for initiating a peak amplitude detection comprises:

a first directional diode path connecting said means for charging said capacitive storage means to said comparing means; and a second directional diode path connecting said means for charging said capacitive storage means with said clocking means.

3. The system of claim 2 wherein said clocking means comprises:

a variable frequency oscillating means for generating an oscillatory signal; and means for phase locking said variable frequency oscillating means onto the train of dipulses from said transducing means.

4. The system of claim 3 wherein said phase locking means comprises:

means for detecting a point on each basic pulse configuration within the train of pulses:

means for generating a reference pulse in response to a detected point in the train of pulses: and means for detecting a phase difference between a generated reference pulse and the oscillatory signal from said variable frequency oscillating means.

5. A transducer positioning system wherein a transducer is positioned over a magnetic disc by sensing previously recorded information, said previously recorded information comprising at least two tracks of recorded information wherein a first track contains spaced sets of magnetic flux reversals to and from a first magnetic state and a second track contains spaced sets of flux reversals to and from a second magnetic state, said transducer positioning system comprising:

transducing means in transducing relationship with said first and second tracks of information and responsive to the sets of flux reversals in each track of information for producing a train of dipulse waveshapes wherein each dipulse waveshape comprises a pair of pulses of opposite signal polarity;

clocking means for generating a clock signal having a first signal level when a first type of dipulse waveshape occurs and having a second signal level when a second type of dipulse waveshape occurs;

means for detecting a peak amplitude of each dipulse waveshape, said detecting means generating a separate signal indicative of a peak amplitude of the first type of dipulse and a separate signal indicative of a peak amplitude of the second type of dipulse, said means for detecting a peak amplitude comprising:

means for detecting the peak amplitude of a pulse having a positive signal polarity in each first type of dipulse occurring within the train of dipulses, and means for detecting the peak amplitude of a pulse having a negative signal polarity in each second type of dipulse occurring within the train of dipulses, wherein each of said means for detecting peak amplitudes comprises:

means for receiving the train of dipulses from said transducing means, means for selectively gating the peak amplitude of only one type of dipulse from the received train of dipulses, and means for generating a signal indicative of the selectively gated peak amplitude, said means for generating a signal indicative of the selectively gated peak amplitude comprises:

capacitive storage means, means, responsive to said selective gating means, for charging said capacitive storage means so as to thereby store the selectively gated peak amplitude, and means for discharging said capacitive storage means at a defined rate so as to decrease the stored peak amplitude present in said capacitive storage means, wherein said means for selectively gating the peak amplitude of only one type of dipulse comprises:

means for feeding back the stored signal level of said capacitive storage means, means for comparing the fedback stored signal level with the received train of dipulses, said comparing means being operative to produce a signal when the amplitude of a received dipulse exceeds the fedback stored signal level, and means for gating the signal from said comparing means with a clock signal from said clocking means; and means for summing the signals indicative of the peak amplitudes of the first and second types of dipulses, said summing means producing a signal indicative of the relative position of said transducer with respect to said first and second tracks of recorded information.

6. The system of claim 5 wherein said means for gating the signal from said comparing means with a clock signal from said clocking means comprises:

a first directional diode path connecting said means for charging said capacitor with said comparing means, and a second directional diode path connecting said means for charging said capacitor with said clocking means.

7. The system of claim 6 wherein the first type of dipulse comprises a pulse of positive polarity followed immediately by a pulse of negative polarity and the second type of dipulse comprises a pulse of negative polarity followed immediately by a pulse of positive polarity.

8. The system of claim 7 wherein said clocking means comprises:

a variable frequency oscillating means for generating an oscillatory signal; and means for phase locking said variable frequency oscillating means onto the train of dipulses from said transducing means.

9. The system of claim 8 wherein said phase locking means comprises:

means for detecting a point on each dipulse within the train of dipulses;

means for generating a reference pulse each time a point is detected in said train of dipulses; and means for detecting a phase difference between a generated reference pulse and the oscillatory signal from aid variable frequency oscillating means.

10. A transducer positioning system wherein a transducer is positioned over a magnetic disc by sensing previously recorded information, said previously recorded information comprising at least two tracks of recorded information wherein a first track contains spaced sets of magnetic flux reversals to and from a first magnetic state and a second track contains spaced sets of flux reversals to and from a second magnetic state, said transducer positioning system comprising:

transducing means in transducing relationship with said first and second tracks of information and responsive to the sets of flux reversals in each track of information for producing a train of dipulse waveshapes wherein each dipulse waveshape comprises a pair of pulses of opposite signal polarity;

clocking means for generating a clock signal having a first signal level when a first type of dipulse waveshape occurs and having a second signal level when a second type of dipulse waveshape occurs;

means for detecting a peak amplitude of each dipulse waveshape, said detecting means generating a separate signal indicative of a peak amplitude of the first type of dipulse and a separate signal indicative of a peak amplitude of the second type of dipulse wherein said peak detecting means comprises:

a positive peak detector means, responsive to the train of dipulse waveshapes, for detecting and measuring the positive peak amplitudes of the first type of waveshape said positive peak detector means comprising means responsive to said clocking means for initiating the detection of a pulse having a positive signal polarity in each first type of dipulse;

a negative peak detector means, responsive to the train of dipulse waveshapes, for detecting and measuring the negative peak amplitudes of the second type of dipulse waveshape, said negative peak detector means comprising means responsive to said clocking means for initiating the detection of a pulse having a negative signal polarity in each second type of dipulse;

wherein each of said peak detector means further comprises:

a capacitive storage means, means, responsive to said initiating means, for charging said capacitive storage means, means for discharging said capacitive storage means at a defined rate, said discharging means being operative to decrease the stored signal level of said capacitive storage means when said capacitive storage means is not being charged by said charging means, means for feeding back the signal level of said capacitive storage means, and means for comparing the signal level of the incoming train of dipulses to said peak detector means with the feedback signal, said comparing means being operative to provide a signal to said initiating means when the signal level of the incoming train of dipulses exceeds the feedback signa; and means for summing the signals indicative of the peak amplitudes of the first and second types of dipulses, said summing means producing a signal indicative of the relative position of said transducer with respect to said first and second tracks of recorded information.

11. The system of claim 10 wherein each of said means for initiating the peak detection of only one type of dipulse waveshape comprises:

a first directional diode path connecting said means for charging said capacitive storage means with said comparing means; and a second directional diode path connecting said means for charging said capacitive storage means with said clocking means.

12. The system of claim 11 wherein the first type of dipulse comprises a pulse of positive polarity followed immediately by a pulse of negative polarity and the second type of dipulse comprises a pulse of negative polarity followed immediately by a pulse of positive polarity.

13. The system of claim 12 wherein said clocking means comprises:

a variable frequency oscillating means for generating an oscillatory signal; and means for phase locking said variable frequency oscillating means onto the train of dipulses from said transducing means.

14. The system of claim 13 wherein said phase locking means comprises:

means for detecting a point on each dipulse within the train of dipulses;

means for generating a reference pulse each time a point is detected in said train of dipulses; and means for detecting a phase difference between a generated reference pulse and the oscillatory signal from said variable frequency oscillating means.

* * * * *